June 8, 1948. H. L. KRAEFT ET AL 2,443,008
TUBULAR FRAME STRUCTURE
Filed Feb. 9, 1945 3 Sheets-Sheet 1
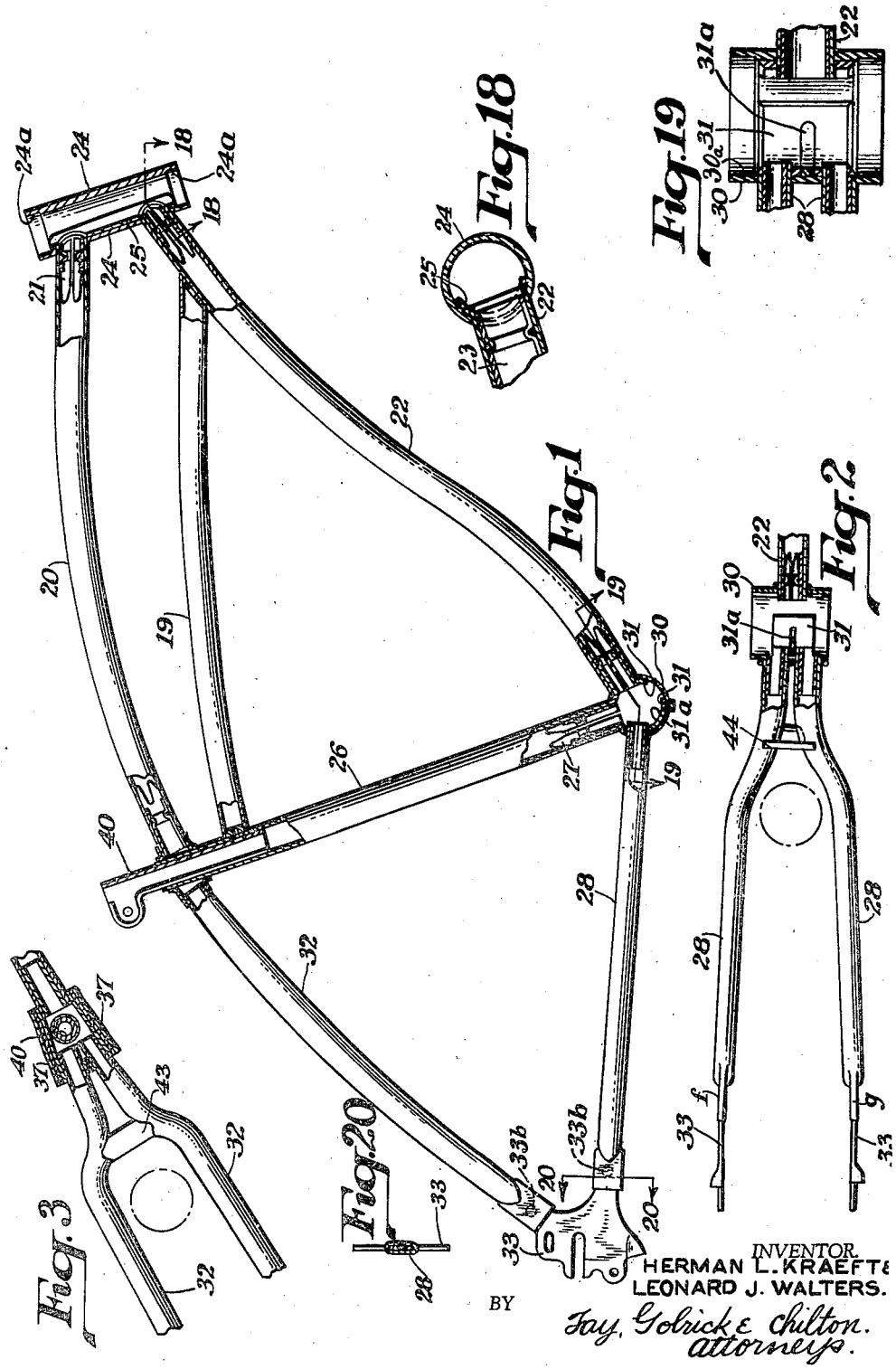
INVENTOR.
HERMAN L. KRAEFT &
LEONARD J. WALTERS.
BY Fay, Golrick & Chilton.
Attorneys.

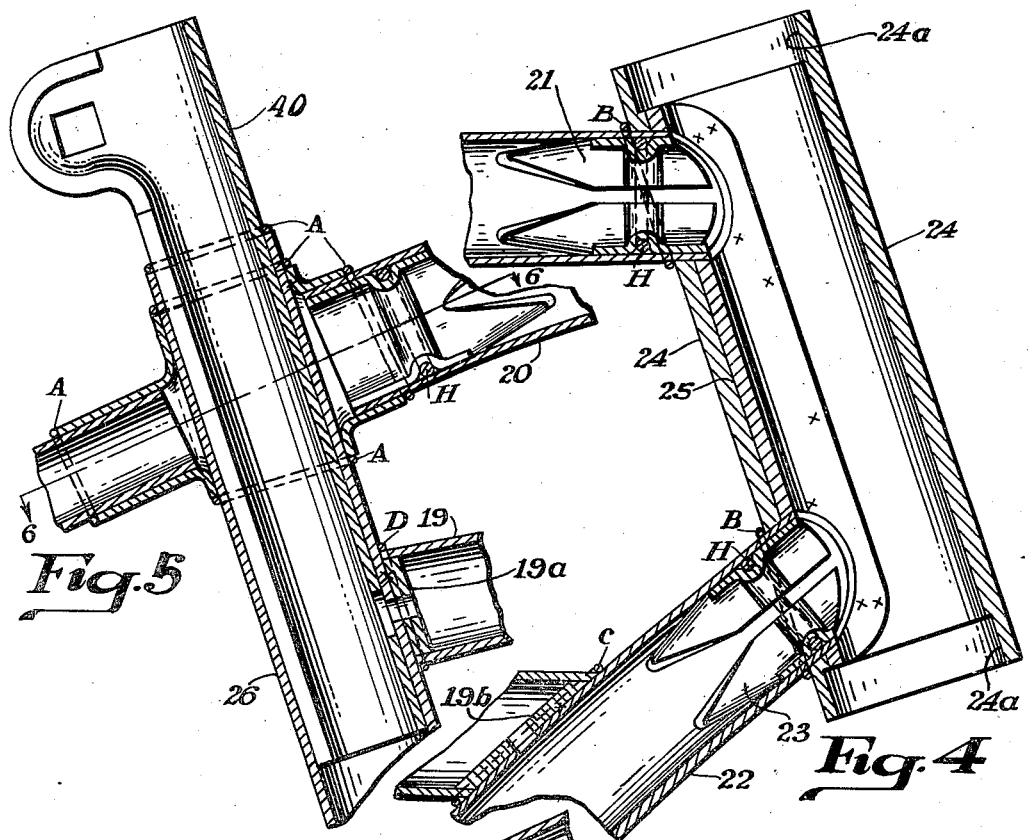
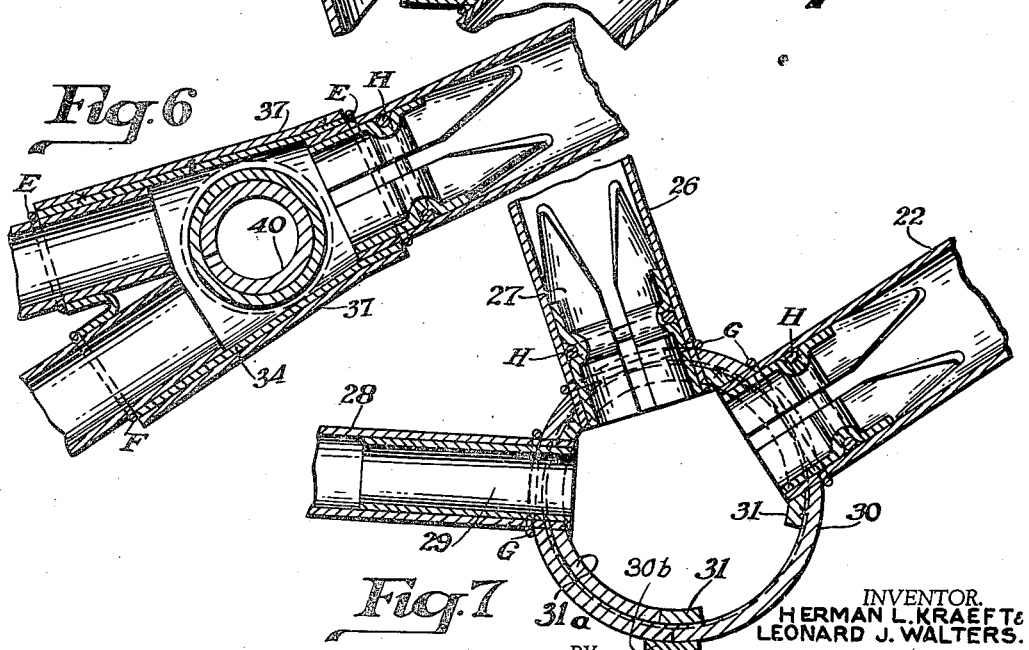

Patented June 8, 1948

2,443,008

UNITED STATES PATENT OFFICE 2,443,008

TUBULAR FRAME STRUCTURE

Herman L. Kraeft, Cleveland Heights, and Leonard J. Walters, Shaker Heights, Ohio, assignors to The Murray-Ohio Manufacturing Company, Cleveland, Ohio, a corporation of Ohio Application February 9, 1945, Serial No. 576,932

3 Claims. (Cl. 287—54)

This application is a continuation-in-part of our application Serial No. 513,163, now Patent 2,435,448, and the general object of the present invention is to provide a reinforced and brazed tubular frame structure having such structural characteristics that the serious item of cleaning costs heretofore involved in the manufacture of brazed frame structures can be practically eliminated.

A further object of the present invention is the provision of a novel brazed bicycle frame structure wherein complete tubular symmetry of the joining surface lines of the tubular members at the joints can be obtained while at the same time providing a frame of an increased strength without adding any substantial weight to the frame.

Another object of the present invention is the provision of a novel concealed joining structure for brazed tubular frames having reinforcing characteristics imparted by members interiorly disposed whereby the brazing of the joints confines the troublesome braze spill within the structure.

A further object of the present invention is to provide a reinforced jointure structure for the head and hanger clusters and a seat post cluster structure in a bicycle frame construction having such structural characteristics as to permit of a rapid and accurate preassembly of the tubes or bars and the clusters of the frame in such manner that the brazing of all of the tubular connections and reinforcements can be effected simultaneously in a non-oxidizing brazing furnace.

The present disclosure is that of tubular bicycle frame structures, although the invention as disclosed is utilizable in the manufacture of tubular structures for various purposes where symmetry, strength and neatness in appearance is desirable.

One of the primary purposes of the present invention is to produce a brazed tubular frame structure of transversely extending tubular members of different diameters which will be double walled at each jointure, and particularly such a structure in a bicycle frame. The double walled jointure is of such construction that all of the numerous parts thereof can be unified, in a stress sense, by a simultaneous brazing operation of all of the clusters or joints of the various types which go to make up such a frame. We have devised particular cluster structures, the use of which will result in a sturdy tubular frame of reasonably light weight and the manufacture of which can be brought about through the use of closely fitting metal-bright tubing and other metal-bright parts, the physical arrangement being such that the preassembly of the parts can be obtained in an economical manner. The designs of the joints or tube connections are such that a subsequent permanent joining or unifying of all of the parts comprising the frame structure can be simultaneously effected by a brazing operation which will require substantially no subsequent cleaning operations, such as wire brushing, grinding, etc.

To the accomplishment of the foregoing and related ends, said invention, then, consists of the means hereinafter described and particularly pointed out in the claims, the annexed drawings and the following description setting forth in detail certain means and one mode, constituting, however, but one of various applications of the principles of our invention.

In said annexed drawings—

Fig. 1 is an elevational view of a bicycle frame produced by and incorporating the features of our invention with the seat post, head structure and hanger housing structure shown in cross-section;

Fig. 2 is a bottom view of the bicycle frame structure shown in Fig. 1;

Fig. 3 is a top view of the seat post region of the frame structure shown in Fig. 1 with parts in section;

Fig. 4 is an enlarged cross-sectional elevation of the fork bearing housing;

Fig. 5 is a similar view taken through the seat post cluster;

Fig. 6 is a cross-sectional view taken through the seat-post cluster structure substantially along the line 6—6 of Fig. 5;

Fig. 7 is an elevational cross-sectional view of the hanger housing structure;

Fig. 18 is a cross-section through the front housing structure along the line 18—18 of Fig. 1;

Fig. 19 is a cross-sectional view taken through the hanger housing along the line 19—19 of Fig. 1; and Fig. 20 is a cross-sectional detail taken along the line 20—20 of Fig. 1.

Figure 8:
Figs. 8 and 9 show reach bar sections before and after a tubular welding operation.

In the drawings a bicycle frame is disclosed as comprising essentially a top reach bar 20, a lower reach bar 22, a head tube or front bearing housing 24, a seat post reach bar 26, a pair of rear lower fork tubes 28, a hanger housing tube 30 and a pair of upper rear fork tubes 32, all of which are to be found in any conventional bicycle frame structure. The upper fork members 32 and the lower rear fork members 28 are joined at the rear of the frame structure by plate members 33.

A second upper reach bar 19 is shown in the drawings which may or may not be incorporated in the frame structure as desired.

Figure 9:
Figure 10:
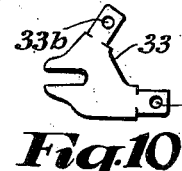
Figs. 10 and 11 are views of a stamping comprising the rear axle yoke of the frame.
Figure 11:
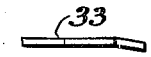

The tubing comprising the foregoing stated bars is formed from cold rolled sheet steel stock into tubular shape as, for example like tubes 26 shown in Figs. 8 and 9 with a longitudinally open seam 26a. This seam is then closed with a gas or electric welding operation and the resulting weld 26b is smooth on the outside but has a bead 26c disposed on the inside. The ends of these various tubes are provided with inserts to thereby obtain a double wall tube structure only at the joining ends thereof, as will be described.

We have devised a thickened jointure structure between the head tube 24 and the upper and lower reach bars 20 and 22 in the form of concealed double walls 24, 25 brazed together whereby all four walls become unitary at the region of greatest stress and fatigue. For this purpose the jointure part of the head tube 24 is increased in thickness by insertion of the preformed wall member 25 comprising a bright metal stamping conforming to the inner surface of the head tube. The jointure or connection structure is generally followed in connecting the seat post reach bar 26, the lower reach bar 22 and the lower fork members 28 to the hanger housing 30. For the hanger housing this jointure procedure comprises the formation of a pre-formed insert plate 31 to be placed within the hanger housing 30 comprising a cold rolled or bright-metal stamping of a thickness substantially equal to the gauge of the stock forming the tubular member 30. Plate 31 when blanked out is also perforated to provide the required openings. These close fitting plates or wall members 25 and 31 are provided for the purpose of doubling approximately the bearing area of the respective reach bars with the head and hanger housings when these reach bars are assembled or closely fitted into the openings formed in the double walls of the tubular members 24 and 30. These smooth surfaced inserts are stamped to conform fairly accurately with the curvature of the smooth inner surface of the tubular members 24 and 30 respectively, and are temporarily attached thereto, preferably by spot welding, so controlled as to not mar the outer appearance of the tubular members 24 and 30. After the inserts 25 and 31 are in place the housing openings are reamed or otherwise accurately produced to conform closely to the diameters of the various reach bars so that when the ends of the reach bars are inserted therein a close fit or press fit is obtained between the housing tubes and inserts and the circumferential surfaces of the inserted ends of the reach bars. The spot welds are indicated by x's, there being three about each hole and three or four near the sides of the plates 25 and 31.

As stated, all of the ends of the aforementioned reach bars 20, 22, 26 and 28 are reinforced to have double walls with the exception of the upper rear fork members 32 and this is accomplished by insert members 21 in the top reach bar 20, inserts 23 in the ends of lower reach member 22, inserts 27 in the lower end of reach bar 26 and inserts 29 in the hanger housing ends of lower rear tubular fork members 28.

Figure 15:
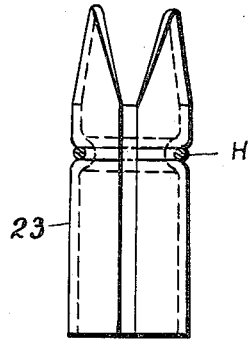
Figs. 15 and 16 are two views of the reinforcing reach bar inserts.
Figure 17:
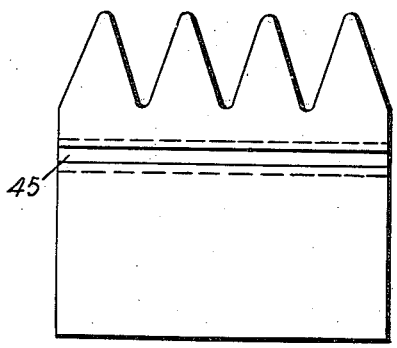
Fig. 17 is a view of the stamping or blank to be curled into insert form.
Figure 16:
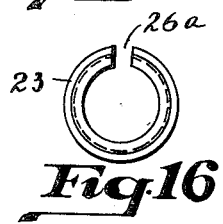

These inserts are in the nature of incomplete tubular sections formed of cold rolled steel or clean metal to closely fit within the ends of the several tubes with the slots 26a thereof disposed to span the inner weld seam bead 26C of the tubes (see Figs. 9, 15 and 16). The ends of the reach bar tubes and inserts over extend the inner surface of the plates 25 and 31, and these extensions are cut off by boring or reaming after the final brazing operation. In Fig. 18 the ends of reach bar 22 and insert 23 are shown after the brazing operation but before the various protruding ends have been cut away as illustrated in Figs. 1 and 4. Each of these inserts may have a rib or groove formation 45 which serves the purpose of stiffening the insert and has an annular cavity for the reception of brazing wire H placed therein at the time these reinforcing members are placed in the reach bar ends. Pre-assembly spot welds may be applied to hold the assembled bars in relative position should the close fitting mentioned be not sufficiently tight to hold the members from shifting during the heating period of the entire frame. We have found, however, that a press fit of .002 to .005 of an inch between the outer end surfaces of the tubular bars and the openings formed in the double wall structure of the front fork and hanger housings is a sufficiently close fit to prevent slippage of the joints during the subsequent brazing heat period. The tubular housing 24 is provided with upper and lower counterbores 24a for the reception and retention of bearing members for supporting the front fork of the bicycle. Also, the hanger housing 30 is provided with counterbores 30a for the reception and retention of crank hanger bearings.

Figure 13:
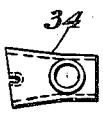
Figs. 12, 13 and 14 are views of drawn and stamped seat post cluster pieces.
Figure 14:
Figure 12:

The seat post cluster structure is of such physical character as to comprise a pre-assembly lock for the final closure or tying step of securing all of the remaining loose ends of the tubes together in a precisely sturdy and simple manner. This cluster comprises an upper smooth stamping 34 and a similar lower stamping 35 (Fig. 14) formed of cold rolled steel. The upper member 34 has an upwardly extending neck or tubular section 36 formed therein and the lower member 35 (Fig. 14) has a similar neck 27 formed therein, both of which are in alignment when the two stamped members 34 and 35 are brought together and in the final assembly steps, form a close tubular engagement with the upper region of the seat post reach bar 26 which extends therethrough (see Figs. 12, 13, 14). The rear parts of the stamped members 34 and 35 have two semi-circular parts in the form of a V which provides tubular engagement with the upper ends of the rear pair of fork members 32. The forward branch ends of the joined members 34 and 35 have an opening of such dimension as to closely embrace the rear end of the upper reach bar 20. Also, the juxtaposed edges of these two members may be machined or otherwise properly fitted so as not to mar the ultimate appearance of the frame. Finishing strips 37 may overlap these seams and may be spot welded preliminarily to one of the members 34—35. After the various reach bars have been brought into assembled relation with the head housing or tube 24 and its insert 25 and/or with the hanger housing 30 and its insert 31, the locking together of the assembly can then be effected by bringing together the two stamped seat post cluster members 34 and 35 in embracing relation to ends of the tubes 21, 26 and tubes 32, whereupon light spot welds may serve to lock the seat post clusters together.

An alternate manner of completing the seat post cluster, comprises the preliminary flash welding of the two stamped members 34 and 35 and press fitting the various reinforced reach bar ends, including the upper rear fork ends, thereinto. The weld flashes, internal and external, are removed before this assembling step and three sub-assemblies are made as follows: Bars 20 and 22 are press fitted to the head 24—25. Seat post 40 and cluster 34—35 and hanger housing 30—31 are pressed together. Rear fork members 28—32 are press fitted to rear yokes 33. These three sub-assemblies are then placed in a press jig and the various free ends of the respective bars are press fitted into the seat post cluster branches and the hanger housing openings.

As stated, the seat post sleeve and clamp 40 is of such form as to closely fit within the upper end of the seat post reach bar 26. In the form shown this sleeve member 40 comprises a stamping affording a post clamping connection with bolt lands 44 for contracting the upper part of the sleeve upon a seat post. The tubular part of the sleeve 40 is split or formed incomplete whereby the split may span, or extend parallel to the weld bead 26c within the tube 26.

We prefer to effect a pre-assembly of the lower fork tube 28 and upper fork tube 32 and the rear yoke plates 33 before attachment of the lower rear fork tubes 28 to the hanger housing 30 and this assembly may be held together by press fitting or by welds at $f$ and $g$. It will be apparent that the order of assembly may vary, as indicated by the foregoing disclosure.

Figure 17A:
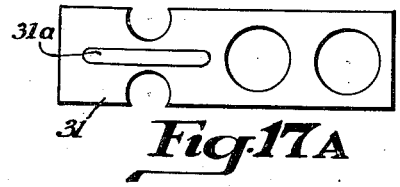
Fig. 17A shows the hanger insert blank.

In order to assure the juxtaposition of the copper to certain of the internal surfaces so that capillary action will be enhanced, perforations 33a may be formed in the coined lugs of the rear axle plates 33 into which may be pressed or otherwise fixed, copper plugs 33b. In like manner a copper plug 31a may be embodied in the hanger insert blank 31 as shown in Fig. 17A. It will be noted in Fig. 7 that the hanger housing tube 30 can be curled from a flat perforated blank joined by an external strip 30b spot welded thereto. The insert blank 30 may be of such length as to extend over the seam of the hanger housing 30. The front fork bearing tube 24 also may be curled up from blank form and the insert 25 may carry copper plugs (not shown) in the manner and for the purposes stated above.

To complete the conditioning of the pre-assembly for the brazing operation, sections of commercially pure copper wire are then disposed at various points A, B, C, D, E, F, G and H and the frame is maintained in such position and the copper pieces are of such shape that the copper pieces are retained in place and visibly disposed. The entire pre-assembly is passed through a brazing furnace and in a non-oxidizing environment, during which the entire frame is subjected to a brazing temperature of from 2025° to 2080° F. At this temperature range the solid copper pieces will be melted to such a fluid state that the copper will flow by capillary attraction between the interconnecting surfaces of all of the tubular members and the inserts. Such overflow or spillage as may take place will be distributed in a very thin, smooth layer of copper coating on the tubing surfaces which will not be perceptible after the frame is decorated. The frame thereafter is passed through a non-oxidizing cooling environment until the temperature thereof is reduced to such point that the copper has solidified and the outer smooth surfaces of the frame will not become oxidized.

The frame thus produced may then be placed in a straightening gauge or fixture to correct any slight distortions which might have taken place in the various tubular members now comprising the unitary frame. Cross struts in the form of stamped members 43 and 44 may then be placed lightly between the converging portions of the upper and lower rear fork members 32 and 28 respectively, and held there if desired by a spot weld, or these members may be fitted to the assembly and brazed thereto during the main brazing operation.

We are aware of the prior practice of pre-assembling of certain of the tubular members by the use of spot welds and also internal locking by forging or hammering the tube ends to maintain pre-assembly of certain of the parts for a subsequent dip brazing process to braze these certain parts together. We are also aware of the use of butt welding methods to bring together cluster assemblies of tubular members in bicycle frames, all of which incurred the expenditure of considerable labor by grinding, filing, wire cleaning, etc., to remove the surplus brazing metal and flux or weld flash metal before the decoration of the frame could be effected. These cleaning operations and costs, particularly in regions difficultly accessible for such cleaning operations have always been a considerable item in the manufacture of decorated tubular frames.

By our disclosed structure, a sturdy light-weight tubular frame structure is obtainable and the double wall, reinforced juncture regions of the tubing at the front fork bearing housing, at the hanger housing and at the seat post cluster are clean and symmetrical in appearance since outer weight adding socket structures are avoided and the entire frame structure when thus produced is ready for final decoration.

The foregoing description of the assembly steps made no reference to the specified manner of including the secondary top reach bar 19 since in some bicycle frame structures the same is omitted. However, this bar can be included in the structure in a manner not in conflict with the entire procedure set forth herein and as follows. Buttons or disks 19a and 19b may be stamped or otherwise formed to accurately fit the outer surfaces of tubes 26 and 22 respectively, and be attached thereto by a spot weld. The disks have a central aperture formed therein which register with apertures formed in the walls of the tubes 26 and 22 for ventilating and braze flow purposes during brazing. The seat post member 40 also has an aperture formed therein at the proper location to register with the opening in disk 19a. The perimeters of these disks are such as to form close fits with the inner end surfaces of the ends of tube 19. Thus tube 19 may first be fitted to disk 19a and then swung down to bring the other end of the tube into snap engagement with the lower edge of disk 19b. (See Figs. 4 and 5.) Copper wires are externally applied when the tube 19 is being assembled.

It will be apparent that the brazed double wall tubular joint structure is useful in the manufacture of tubular structures other than bicycle frames where comparatively light weight and sturdiness, coupled with appearance, are desired.

It will be noted that the counterboring of both hanger housing and front fork bearing housing is shown in the drawings together with the disposition of copper plugs, wiring, etc., but we desire to point out that the final machining operations of cutting off the forward ends of bars 19 and 20 and their inserts and the hanger housing counterboring, are effected after the complete assembly has passed through the brazing furnace.

Other forms may be employed embodying the features of our invention instead of the one here explained, change being made in the form or construction, provided the elements stated by any of the following claims or the equivalent of such stated elements be employed whether produced by my preferred method or by others embodying steps equivalent to those stated in the following claims.

We therefore particularly point out and distinctly claim as our invention:

1. In a tubular bicycle frame, a front fork bearing housing construction comprising a counterbored bearing receiving tube, a tube wall thickening lamination of metal disposed within the tube between a lower and an upper bearing receiving counterbore formed within the tube and secured to the inner face of the tube wall in intimate contact therewith, said tube wall and lamination forming a double wall having an upper and a lower bore formed therethrough for the fitted reception of an end of an upper and of a lower reach bar, upper and lower reach bar ends having reinforcing tube-shaped members inserted therein in the ends of said reach bar ends and the ends of the tube-shaped members being press fitted into the double walled bores formed in the fork bearing tube and lamination and all four of said members having a brazed connection between the fitted surfaces thereof.

2. A tubular frame structure wherein tubular members extend transversely to each other comprising a concealed double walled joining structure between two tubes of different diameters and each tube having double walls at the joint including an inserted lamination of metal disposed within the larger of the two tubes to form the second wall thereof and being in intimate contact with the inner surface of the larger tube throughout one major curved surface of the lamination and there being an opening extending through the double wall corresponding substantially to the circumference of the smaller tube, a tubular reinforcing insert disposed in an end of the smaller tube to form the second wall of the smaller tube and said double walled end of the smaller tube extending through said opening formed in the double wall of the larger tube in press fitted relation to both walls of the larger tube, the double walled joint having a brazed connection between the outer circumferential surface of the smaller tube and each of the circumferential walls of the opening formed in the wall of the larger tube and its lamination.

3. A tubular frame structure wherein tubular members extend transversely to each other comprising a concealed joining structure between two tubes of different diameters consisting of an inserted lamination of metal disposed within the larger of the two tubes and being in contact with the inner surface of the larger tube over one entire surface of said lamination, there being a lateral opening in the larger tube and the lamination having an opening in registration with the lateral opening of the larger tube, a reinforcing insert disposed in an end of the smaller tube and terminating at the end of the smaller tube and said reinforced end of the smaller tube extending through the registered openings of the lamination and of the larger tube in press fitted tube bearing relation to the walls of said openings, the joint having a brazed connection between the walls of the openings of both the lamination and the larger tube and the circumferential surface of the inserted reinforced part of the smaller tube and between the smaller tube and its insert.

HERMAN L. KRAEFT.
LEONARD J. WALTERS.

REFERENCES CITED

The following references are of record in the file of this patent:

UNITED STATES PATENTS

| Number | Name | Date |
|---|---|---|
| 562,067 | Copeland | June 16, 1896 |
| 590,307 | Finley | Sept. 21, 1897 |
| 603,244 | Avery | May 3, 1898 |
| 643,591 | Caswell | Feb. 13, 1900 |
| 736,527 | Latta | Aug. 18, 1903 |
| 2,174,693 | Early | Oct. 3, 1939 |

FOREIGN PATENTS

| Number | Country | Date |
|---|---|---|
| 8,489 | Great Britain | Apr. 2, 1897 |
| 20,146 | Great Britain | Sept. 11, 1896 |
| 436,485 | France | Jan. 24, 1912 |
| 456,503 | Germany | Feb. 24, 1928 |